Jan. 22, 1957  J. TITTMAN  2,778,951
NEUTRON LOGGING METHOD AND APPARATUS
Filed Dec. 12, 1952  2 Sheets—Sheet 1

INVENTOR.
JAY TITTMAN
BY
Campbell, Brumbaugh, Free & Graves
HIS ATTORNEYS

Jan. 22, 1957   J. TITTMAN   2,778,951
NEUTRON LOGGING METHOD AND APPARATUS
Filed Dec. 12, 1952   2 Sheets-Sheet 2

INVENTOR.
JAY TITTMAN
BY
Campbell, Brumbaugh, Free & Graves
HIS ATTORNEYS

2,778,951

NEUTRON LOGGING METHOD AND APPARATUS

Jay Tittman, Danbury, Conn., assignor to Schlumberger Well Surveying Corporation, Houston, Tex., a corporation of Delaware Application December 12, 1952, Serial No. 325,582

15 Claims. (Cl. 250—83.6)

This invention relates to neutron-neutron logging of earth formations traversed by a borehole.

In neutron-neutron logging, a source of neutrons is lowered into a borehole together with a suitable neutron detector maintained at a given spacing from the source. Neutrons emitted by the source enter the surrounding formations and are affected thereby in a manner depending upon the initial energy of the neutrons and the nature of the formations. Detection of the neutrons thus yields some information about the formations. The initial energy of the neutrons, the source-detector spacing, and the energy sensitivity of the detector determine to a large extent the type of information received.

Thus, it has been found that very useful information can be obtained from the scattering or slowing down effects of the formations on neutrons having a given initial high energy. Further experiments show that this slowing down or moderating effect is most readily observed when the longitudinal spacing between the source and detector is substantially zero.

Since neutrons carry no electrical charge, most of their energy on entering earth formations is lost in direct elastic collisions with nuclei of the atoms composing the formations. Thus, if the detector is sensitive only to low energy neutrons, the slowing down or moderating effect of the formations on the initial high energy neutrons can be indicated. The number of low energy neutrons present in a given region depends, among other factors, on the density, scattering cross section of the formation nuclei, and the relative masses of the neutrons and the nuclei with which they make collisions. Porous formations saturated with hydrogenous fluids, for example, slow down neutrons of a given initial high energy much more effectively than do non-porous formations, such as compact limestone or other dry rocks. This greater slowing down effect is due to the presence of hydrogen nuclei in the hydrogenous fluids. For equal numbers of hydrogen nuclei and other heavier nuclei, for example, the probability of collisions between the neutrons and the heavier nuclei is less than that for collisions between the neutrons and hydrogen nuclei. Moreover, because the mass of hydrogen nuclei is much less than that of other nuclei, proportionately greater velocity is lost from the neutrons on elastic impact with the hydrogen nuclei than is lost on impact with heavier nuclei.

It would appear that a very good indication of the porosity of formations would be obtained if the low energy, i. e. thermal and/or epithermal neutrons present in a formation were counted while the formation was being irradiated with relatively high energy neutrons.

Practical application of these principles is difficult, however, since drilling muds contain hydrogen compounds which would absorb the high energy of most of the neutrons initially ejected from a source disposed in the borehole. Most of the low energy neutrons present in the borehole would have reached either epithermal energy or thermal equilibrium energy as a result of collisions with the hydrogen nuclei in the mud rather than with the hydrogen nuclei in the formation. A low energy neutron detector adjacent the neutron source would predominantly indicate mud effects, and any low energy neutrons which lost most or all of their energy above thermal equilibrium in the formations would be virtually masked. Furthermore, this masking effect of the mud becomes more troublesome as the longitudinal spacing between the source and detector is decreased, being most pronounced when the source-detector spacing is substantially zero. As stated, experiment has shown that best indications of porosity, for a given source size, are obtained by counting low energy neutrons when the source-detector spacing is zero. Moreover, zero spacing has the further advantage of giving maximum vertical resolution between adjacent formations of different porosity as the logging device is passed through such formations.

In an effort to overcome the problem of mud interference, it has been proposed to press the source and detector of neutrons against the wall of the borehole. However, even with this arrangement, some uncertainty in the results is introduced by neutrons which never entered the formations but were slowed down by the mud to epithermal or thermal energy levels before detection. Additional contribution to the counts is attributable to neutrons which, though spending some time in the formation, suffered most of their slowing down in bouncing around in the mud column. The neutrons detected in this category are generally more pronounced the greater the diameter of the borehole. Thus, while it may be possible to get high energy neutrons into the formations, accurate detection of low energy neutrons whose loss of energy can be properly attributable to the formation porosity rather than to the mud has heretofore been difficult to attain.

It is an object of the present invention to provide an improved neutron-neutron method and apparatus for logging boreholes containing oil or water base drilling liquids.

More particularly, it is an object of the invention to provide a novel neutron-neutron logging device which will give a more accurate indication of the porosity of formations than has heretofore been possible by neutron logging techniques.

Another object of the invention is to provide a neutron-neutron logging method and apparatus which substantially reduce the masking effect of mud in the borehole on the information bearing neutrons that are returned to the borehole from the surrounding formations.

Another object of the invention is to provide a neutron-neutron logging method and apparatus which minimize variation in the neutron counting rate resulting from changes in the diameter of the borehole.

Still another object is to provide improved apparatus incorporating the principles of the present invention for determining the dip of strata traversed by a borehole.

The invention contemplates displacing the borehole fluid from a zone contiguous with the wall of the borehole, radiating high energy neutrons from the borehole into the surrounding formation through the zone, detecting low energy neutrons in the borehole received substantially only through the zone, and transmitting electrical signals indicative of the neutron flux out of the borehole. Usually, the neutron counting rate is recorded at the earth's surface as a function of the position of the zone along the borehole.

Suitable apparatus may comprise a pad made of a substance substantially transparent to low energy neutrons which is pressed against the wall of the borehole to displace the borehole fluid. The high energy neutrons are emitted by a source which may be located in the pad. A detector of the neutrons passing through the pad from the formation, i. e., thermal and/or epithermal neutrons, is employed with a neutron shield surrounding the same except for an aperture facing the pad. Conventional indicating instruments may be used to record the neutron counting rate as a function of the depth of the pad in the borehole.

It has been found to be desirable to attenuate those neutrons that migrate across the wall of the borehole adjacent the zone of displaced fluid. This may be accomplished by a second shield or barrier bounding the neutron-transparent pad and adapted to slide along the wall of the borehole.

In order that the invention may be more fully understood, it will now be described in detail, reference being made to the accompanying drawings in which.

Figure 1:
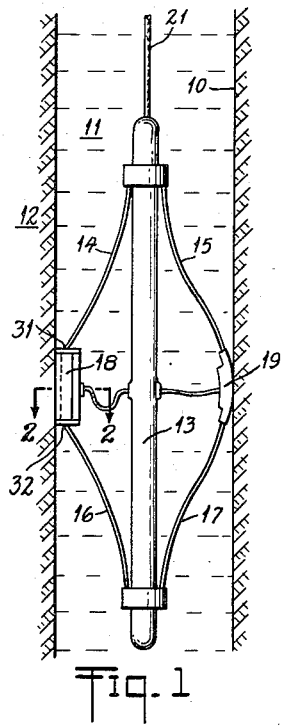
Fig. 1 is a schematic view of one embodiment of the neutron logging probe of the present invention disposed in a borehole with associated apparatus.

Referring now to Fig. 1, there is shown a borehole 10 containing a drilling mud 11. One form of apparatus suitable for neutron-neutron logging of the formations 12 traversed by the borehole 10 may comprise an elongated cylindrical housing 13 slidably supporting oppositely disposed bowed upper springs 14 and 15 and corresponding lower springs 16 and 17 at their upper and lower ends, respectively. The springs 14 and 16 are arranged to hold a neutron logging probe 18 resiliently against the wall of the borehole 10. The springs 15 and 17 support a pad 19 pressed against the opposite side of the borehole to balance the force exerted by the springs 14 and 16 and thus maintain the housing 13 substantially centered in the borehole. The pad 19 may include electrodes for making electrical logs simultaneously with the neutron log. Other well-known means for supporting and urging the neutron logging probe 18 against the wall of the borehole 10 may, of course, be employed. A cable 21 is secured to the housing 13 to raise and lower the apparatus in the borehole in a well-known manner and incorporates electrical conductors for making connection with control or indicating apparatus at the earth's surface.

Figure 2:
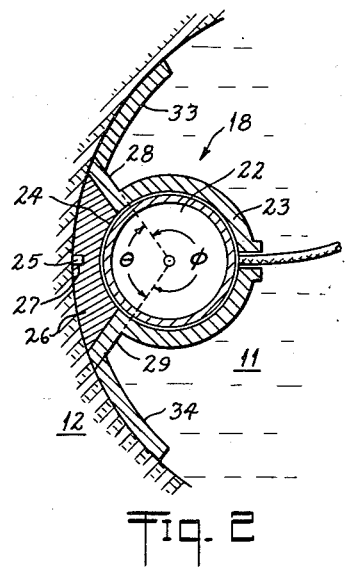
Fig. 2 is a transverse sectional view on an enlarged scale of the probe shown in Fig. 1 taken along the dashed line 2—2 in the direction indicated by arrows.

As shown in Fig. 2, the probe 18 comprises any suitable low energy neutron detector 22, but it is preferably a thermal neutron detector.

The cylindrical surface of the neutron detector 22 is surrounded for a circumferential angle of $\phi$ degrees by a shield 23 of a material substantially opaque to both thermal and epithermal neutrons. The shield material is preferably composed of cadmium or boron-carbide. An unshielded aperture 24 is left facing the adjacent wall of the borehole 10. A source 25 of high energy neutrons, formed, for example, by a radium-beryllium pellet, is supported in front of the aperture 24. A mud displacer 26 occupies the remaining space between the aperture 24 and the adjacent wall of the borehole 10. The neutron source 25 may be located in a cavity 27 in the mud displacer 26 which is composed of a material that is substantially transparent to thermal and epithermal neutrons, for example, solid aluminum. As the term implies, the mud displacer 26 serves to squeeze out any drilling liquid between the aperture 24 in the shielding of the detector 22 and the formation 12.

In order to prevent low energy neutrons in the surrounding column of drilling mud 11 from affecting the detector 22, the sides of the mud displacer 26 are bounded by generally radially extending flanges 28 and 29 of the shield 23, as shown in Fig. 2. The top and bottom portions of the detector 22 are also shielded with similar material by means of discs 31 and 32, respectively (Fig. 1), having extensions which register with the flanges 28 and 29.

In order to render the device relatively insensitive to variations in the diameter of the borehole, low energy neutron shields or barriers are provided in the form of resilient pads or barrier flaps 33 and 34, containing material substantially opaque to thermal and/or epithermal neutrons and extending from the flanges 28 and 29, respectively. The flaps 33 and 34 are adapted to lie against the wall of the bore hole 10 and conform to the shape of the same substantially independently of the borehole diameter. For this purpose the flaps 33 and 34 may be resilient or may be flexible and provided with a resilient backing. In the actual construction of the flaps, thin spring steel plates backed with cadmium may be used. Alternatively, if boron-carbide is employed as the low energy neutron absorber, a flexible plastic such as the tetrafluoroethylene polymer, sold under the name "Teflon," may be formed into a curved resilient plate in which the boron-carbide may be placed. The barrier flaps 33 and 34 may extend some distance above and below the aperture 24 in the shielding of the detector 22.

If a boron trifluoride filled detector is used, it is necessary, in order to avoid interference from gamma radiation, to operate the detector 22 in the ionization chamber region or in the proportional region and not in the Geiger counter range. The pulse height in the former regions due to the low energy neutrons bombarding the nuclei of the gas in the detector to cause ionization by disintegration, will be many times the pulse height due to gamma radiation, while, in the Geiger region, all the pulse heights are approximately the same and direct gamma radiation from the source 25 would mask the pulses due to neutrons if no shielding were present. Thus, when operated in the ionization or proportional regions the smaller pulses due to gamma radiation can be clipped leaving only pulses due to the neutrons.

However, should a counter be used of the type operating in the Geiger region and which detects slow or thermal neutrons by counting gamma radiation produced by materials disintegrating under the action of such neutrons, it would be necessary to shield the counter from all gamma radiation due to any source other than that caused by the neutrons. This could be accomplished by lining with lead those portions of the detector exposed to undesired sources of gamma radiation. However, this shielding arrangement tends to be bulky and complicated.

Inasmuch as the detector 22 is preferably only sensitive to epithermal and/or thermal neutrons and not to gamma radiation, no shielding between the source 25 and the detector 22 is necessary.

In operation, the logging apparatus is raised through the well by the cable 21, while the probe 18 bears against the wall of the borehole 10. High energy neutrons from the source 25 penetrate the formation 12. These neutrons become scattered by elastic collisions and eventually are slowed down to thermal or epithermal energy at various places in the formation and in numbers dependent primarily upon the fluid content and thus porosity of the surrounding formation. Some of these low energy neutrons are directed back through the neutron-transparent mud displacer 26 and are detected by the detector 22. Other low energy neutrons enter the borehole 10 at different portions of the side wall and may be further slowed by the drilling liquid 11. Still other neutrons may bound back and forth between the formations and the liquid 11. In any event it will be appreciated that the number of low energy neutron counts will depend upon the number of low energy neutrons present in the formation in front of the probe 18, which in turn will primarily depend upon the porosity of the formation. Thus, if the number of counts is logged as a function of the position of the probe 18 as it is moved along the borehole, an indication of the porosity of the formations at different depths can be obtained.

The number of low energy neutrons detected by the detector 22 that are slowed solely by the drilling liquid 11 compared to the number of low energy neutrons detected by the detector 22 that are slowed by the formations, suitably weighted by considerations of counting rate statistics and the resolving efficiency for formations of different porosities, constitutes a good indication of the effectiveness of the logging device and its ability to produce a useful log. Thus, for example, one can divide the neutrons counted by the detector 22 into two groups. The first group contains neutrons which never left the mud column before being detected. The second group consists of all those neutrons which spend some time in the formation prior to being detected. The former group may be designated as non-information bearing counts (NIBC) since they carry no information about the nature of the formation. The latter may be called information bearing counts (IBC) since at least a part of their slowing down occurred in the formation. The IBC in turn can be separated into two groups. One of these groups contains neutrons which spent their entire lifetime in the formation prior to detection. Thus, for example, compact limestone or dry rocks will yield fewer slow neutrons in the formation immediately in front of the probe than will hydrogenous formations. The second IBC group will consist of detected neutrons which have bounced back and forth one or more times between the mud column and the formation. Such neutrons, although information bearing, and included in the above definition of IBC, are affected in their slowing down by the mud column as well as by the formations.

The largest adverse effect to be reduced is that of the NIBC, and for some purposes the ratio of NIBC/IBC can be taken as a criterion of effectiveness for the device. As will be shown later, the minimization of this ratio yields the optimum angle $\phi$ for the shield 23. The elimination, or attenuation, of those IBC which represent neutrons which have bounced back and forth between the mud column and formation, is then accomplished by the shielding flanges 28 and 29 and the barrier flaps 33 and 34. The flanges 28 and 29 also serve as an extension of the shield 23 in reducing the ratio NIBC/IBC. The remaining part of the IBC then consists predominantly of those neutrons which have had all their slowing down effected by the formation, and it is the number of neutrons in this category which is most strongly affected by the porosity of the formation.

The manner in which the respective shields and barrier flaps described in Fig. 2 effect the minimization of the ratio NIBC/IBC will become clear from the following discussion read in conjunction with Figs. 3 to 7.

Figure 3:
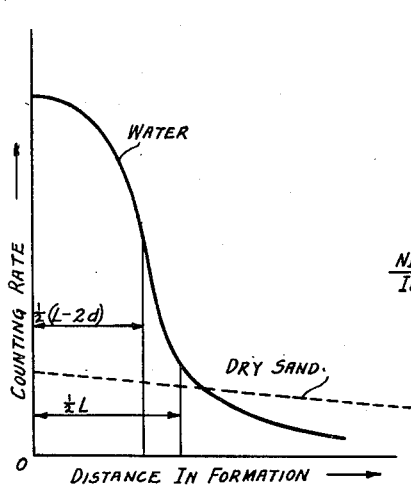

Referring to Fig. 3 there are shown qualitative curves indicating the counting rate of thermal neutrons plotted as a function of various distances in representative earth formations. In this graph, a source of neutrons, located at the origin, is disposed in a homogeneous medium of either water or dry sand. The abscissa scale then represents different radial distances between the source and various points in the formation. The ordinate scale represents the counting rate which would be indicated by a detector disposed at said points. The water characteristic shown as a solid curve, is substantially of the form to be expected if the formations were 100% porous and filled with liquid. It will be seen at once that a very large counting rate of thermal neutrons due to a water or a porous medium is evident at distances close to the source while further out into the medium the counting rate drops off. For dry sand, which characteristic is designated by the dotted curve and is representative of non-porous formations, the counting rate of thermal neutrons in the immediate vicinity of the source is considerably less than in the case of the water curve, and falls off less rapidly.

From the curves of Fig. 3, it will be apparent that under ideal conditions, that is, with no interference from the drilling mud, porous and non-porous formations could be readily distinguished by comparing the respective counts, and furthermore, the counting rate could be quantitatively related to the porosity. It is the purpose of the shielding arrangement of the present invention to provide a logging system approaching this ideal case as nearly as possible.

As stated above, however, the presence of the drilling fluid without such method and apparatus as described herein, would mask almost completely the low energy neutrons slowed by hydrogenous formations. Even when the logging probe 18 is urged against the formations without the shield 23 (Fig. 2), the ratio of NIBC, or neutrons slowed solely by the drilling liquid, to IBC or neutrons slowed substantially by the formations, will be almost unity.

Figure 4:
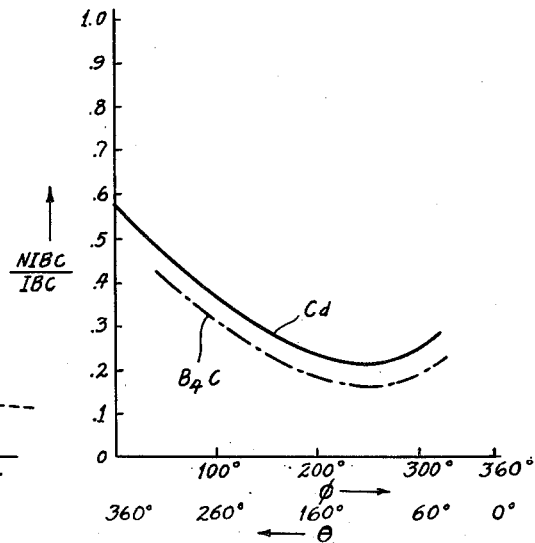

Referring to Fig. 4 there is shown a graph indicating the improvement in the counting ratio obtainable solely by use of the special shield 23 of Fig. 2. The solid curve is for a cadmium shield and the dot-dashed curve for a boron-carbide ($B_4C$) shield. As shown in Fig. 4, the angle representing the circumferential extent of the shield 23, is plotted in degrees along the abscissa axis while the ratio of non-information bearing counts to information bearing counts (NIBC/IBC) when the probe is adjacent a 100% porous formation is plotted along the ordinate axis. It will be noted that this ratio drops to a minimum value of about 0.24 for a cadmium shield and about 0.19 for a boron-carbide shield as $\phi$ increases to about 250° and then begins to increase as $\phi$ is increased further. One of the reasons for this fact is that as $\phi$ is increased beyond 250° the aperture 24 becomes too small, causing a more rapid decrease in the IBC than in the NIBC. Moreover, some of the IBC neutrons are accepted from the sides of the formations immediately adjacent the flanges 28 and 29 and these are precluded from reaching the counter when $\phi$ is increased beyond 250°. The radial flaring of the flanges 28 and 29 serves to exclude neutrons slowed by the drilling liquid 11, while permitting entry of neutrons slowed by the formations and entering at the edges of the aperture 24.

It will be noted that a greater reduction in the ratio NIBC/IBC is obtained by using the boron-carbide shield (dot-dashed curve) instead of the cadmium shield. This fact indicates that an appreciable portion of the NIBC are epithermal neutrons, that is, neutrons of energy slightly above the thermal level, since boron-carbide is more effective in blocking epithermal neutrons than is cadmium.

The mud displacer 26 disposed between the aperture 24, the flanges 28 and 29, and the wall of the borehole 10 positively excludes mud or drilling liquid which might otherwise leak in around the flange edges where they touch the borehole wall. The presence of this mud displacer, which is quite transparent to low energy neutrons, further decreases the minimum ratio NIBC/IBC from about .19 (Fig. 4) to about .04, thus making the NIBC practically negligible and providing an excellent approximation to the ideal conditions illustrated in Fig. 3.

The use of the shield 23, the shield flanges 28 and 29, and the mud displacer 26 in reducing the ratio NIBC/IBC also causes a reduction in total counting rate, since some IBC are excluded at the same time as the NIBC are being excluded. The net reduction in the ratio NIBC/IBC (Fig. 4) testifies to the fact that proportionately more of the NIBC than the IBC are eliminated from the total counting rate. A more refined analysis of the situation, which takes into account the statistical fluctuations in counting rate, results in a choice of a figure of merit which indicates a slightly lower optimum value of about 200° for the angle $\phi$. In order to provide a dihedral angle $\theta = (360° - \phi)$ or $(360° - 200°)$ or 160° for the aperture without having the information bearing counting rate masked by interference of the drilling liquid, the mud displacer 26 and the shielding flanges 28 and 29 are highly desirable. Considerations, however, of variations in borehole diameter indicate that $\theta = 160°$ is near one end of its desirable range. Accordingly, the preferable range of dihedral angle $\theta$ is between 60° and 160°.

Figure 5:
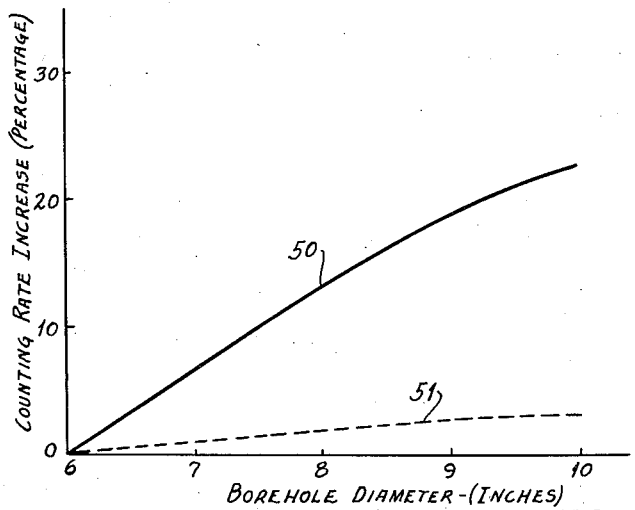
Figs. 3, 4 and 5 are graphs useful in explaining the invention.

Although the NIBC have been practically eliminated in the manner already described, it is of further importance to reduce variations in the IBC which depend upon the volume of fluid in the borehole in the vicinity of the probe and thereby, in effect, depend upon the diameter of the borehole. It has been found that these variations occur principally in that component of the IBC which is caused by neutrons which have bounced back and forth between the formation and the mud column and ultimately have entered the detector 22 from the formation through the aperture 24. For example, the solid curve 50 in Fig. 5 illustrates the percentage increase in counting rate as a function of the diameter of a borehole which traverses a formation of dry sand, using the probe of Fig. 2 without the barrier flaps 33 and 34. Since it is desired that the counting rate be a function of the formation characteristics only, the barrier flaps 33 and 34 were appended. The resulting improvement with the flaps is shown by the dashed curved 51. The reduction in the variation of the counting rate with increasing borehole diameter when flaps are used is strikingly shown in the dashed curve 51 in Fig. 5 compared to the solid curve 50. The neutron absorbing material in the barrier flaps 33 and 34 (Fig. 2) serves to prevent the migration of neutrons across the wall of the borehole 10. Since the number of such neutrons which would diffuse across the wall depends on the diameter of the borehole, the reduction in the number of these neutrons then reduces the effect of the borehole diameter on the over-all counting rate.

Figure 6:
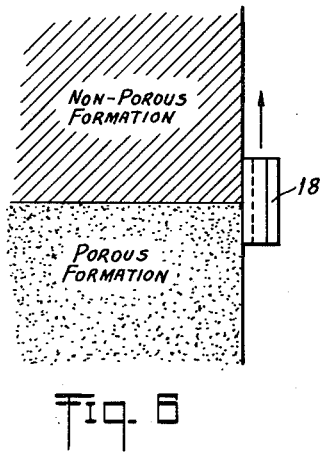
Fig. 6 is a schematic diagram of a fragment of a borehole wall as viewed in longitudinal section showing the interface between porous and non-porous formations.
Figure 7:
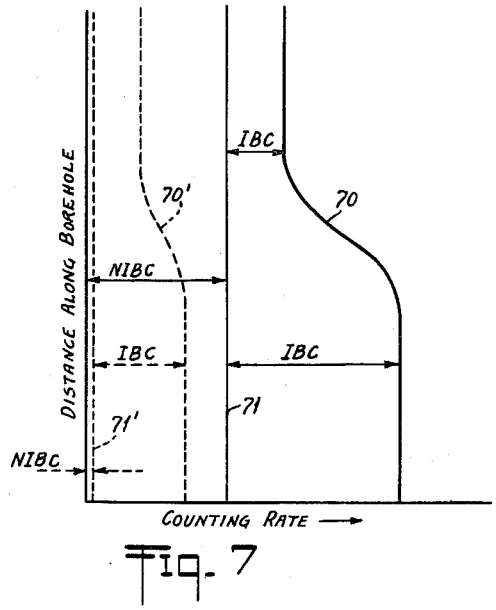
Fig. 7 is a graph showing the neutron counting rate as a function of distance along the borehole adjacent the interface shown in Fig. 6 with different forms of neutron probes.

Figs. 6 and 7 illustrate in a different manner the improvements realizable by the use of the shielding arrangements described. Fig. 6 discloses diagrammatically a fragment of a borehole wall including an interface between non-porous and porous formations. The neutron logging probe 18, without suitable shielding, will produce a log as shown by the solid curve 70 in Fig. 7. The curve 70 is composed of a substantially constant component indicated by a straight line 71 representing the non-information bearing counts which do not respond to changes in the porosity of the formation and a variable component representing the information bearing counts which give the curve 70 its character. The ratio of NIBC to IBC is determined by the ratio of the distance between the ordinate axis and the line 71 to the distance between the line 71 and the curve 70. Opposite porous formations the ratio is a little less than unity while opposite non-porous formations the ratio is substantially greater than unity.

By the addition of the shields 23, 28 and 29 and the mud displacer 26, the number of NIBC is materially reduced, having the effect of transforming the curve 70 into the dotted curve 70'. The NIBC are now indicated by a dotted straight line 71'. Thus, the ratio of NIBC to IBC for porous formations is reduced to about .04 when the shielding and the mud displacer are employed.

The reduction of NIBC not only improves the raito NIBC/IBC but permits much greater accuracy in distinguishing between non-porous and porous formations. This increase in accuracy is due to the fact that within moderate limits, a statistically more accurate indication of any one formation, porous or non-porous, can be had when the total number of counts includes a minimum of non-information bearing counts. For example, the IBC given by the dotted curve 70' of Fig. 7 opposite any one formation will be fixed with considerably less margin of statistical eror in the counts if the NIBC is negligible as indicated by the line 71' than in the case where the IBC are superimposed upon a large value of NIBC as is the case shown by the curve 70 and the line 71.

Figure 8:
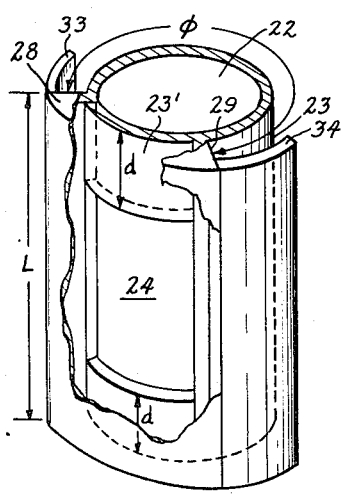
Fig. 8 is an oblique view of a modified shielding arrangement for the neutron probe.

Fig. 8 is an oblique view of a further shielding arrangement for the logging probe 18. The shield 23' is extended downwardly from the top and upwardly from the bottom of the detector 22 reducing the length of the aperture 24. If a purely thermal neutron detector is used, it has been found that as the distance $d$ is increased, or the length of the detector is decreased from about eleven inches to five inches, then the ability of the probe to distinguish between porous and non-porous formations is improved by about thirty percent, although the total number of counts from each type formation is decreased. This improvement continued until a certain optimum value of $d$ was reached and further increase in $d$ indicated a loss of this improvement. The shortening of the aperture 24 will thus tend to exclude thermal neutrons due to non-porous formations more than it will exclude thermal neutrons due to porous formations as the distance $d$ is increased, but only up to a certain value of $d$. For the application of this apparatus, it has been found preferable to maintain a symmetrical placement of the source with respect to the length of the detector.

Referring again to Fig. 3 it will be noted that the abscissa axis indicates the distance between a source at the origin and a point or test detector. If this length is taken in a direction parallel to the borehole and thus parallel to the longitudinal axis of the logging probe 18, the total length of formation covered by the detector 22 may be defined as $L$. The length of the detector less $2d$ or $L - 2d$ will be the length of the aperture 24 exposed to the formations. It will be appreciated that since the total number of counts for either the water or dry sand curves which may be representative of porous and non-porous formations, respectively, is approximately proportional to the areas under these curves, any increase in the ratio of the area under the water curve to the area under the dry sand curve will increase the ratio of the total number of counts attributable to each and thus permit them to be more readily distinguished. As the distance $L - 2d$ is decreased, it will be noted that a proportionately greater fraction of the area under the dry sand curve is excluded than under the water curve. Therefore, the ratio of the total counts for sand to the total counts for water when the length of the aperture 24 is $L - 2d$, is less than when the length of the aperture 24 is $L$.

Experience indicates than an aperture 24 in the shield 23' corresponding to a length $L - 2d$ of about two to six inches with a dihedral angle $\theta$ approximately 110° is an advantageous range for improved differentiation in the slow neutron counting rate in response to the usual porosities met in well-logging. Though detectors sensitive mainly to slow neutrons in the epithermal range can be used in logging, it is preferable to use detectors sensitive mainly to thermal neutrons.

Similarly, an arrangement indicating the ratio of the counting rates for thermal neutrons and epithermal neutrons would provide a differentiation between high and low porosities for the strata logged.

Figure 9:
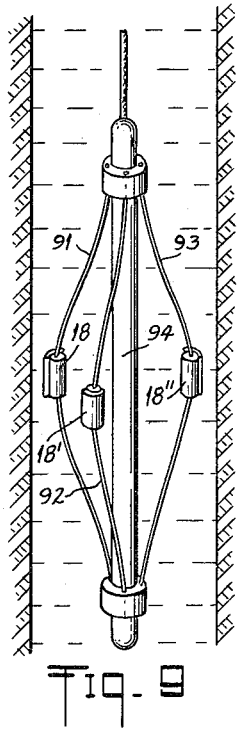
Fig. 9 is a schematic view of apparatus for measuring the dip of earth formations by means of a plurality of neutron probes.

Referring now to Fig. 9 there is shown a system for determining the dip of strata traversed by a borehole by utilizing three of the neutron logging probes 18, 18' and 18" spaced in a horizontal plane approximately 120° apart and each being urged against the borehole wall by suitable bowed springs 91, 92 and 93, respectively, slidably supported by a central housing 94. Any dip in the formations as the apparatus of Fig. 9 is raised through the borehole will be indicated by the relative displacements of corresponding changes in the logs recorded from each of the probes 18, 18' and 18".

One advantage of utilizing the present invention for dip measurements resides in the excellent vertical resolution of the neutron logging probe. As pointed out above, this improved vertical resolution results from the fact that there is substantially zero spacing in the vertical direction between the neutron source and the detector. Moreover, the azimuthal angle of investigation is such, in accordance with the shielding arrangement, that neutrons ejected by one probe will not interfere with neutrons ejected from the other probes separated by an azimuthal angle of 120°. A further advantage is that dip may be measured in the presence of oil base drilling liquids. As a result of the features indicated above, the detection of an interface of formations has been improved over that heretofore available by other radiation detection methods.

While it is true that the best difference indications would be between highly porous and non-porous formations, the counting rates will nevertheless be different for any differences in the porosities between formations; and the substantial elimination of NIBC will enable even small counting rate differences in IBC to be readily observed. It should be noted that the use of neutron-neutron logging is substantially unaffected by variations in naturally occurring radioactive materials which would affect the interpretation of small changes in counting rates when gamma rays are used. This advantage is particularly emphasized in the apparatus and method described above, especially in the application to dip measurements.

While this invention has been described with particular emphasis on the various shielding arrangements, it should be kept in mind that various refinements known to those skilled in the art may be utilized in the over-all apparatus. The wall face of the pad containing the above-discussed displacer, flanges and flaps could be made of flexible non-hydrogenous material with a neutron absorbing compound added to the flanges and flaps.

Other modifications of the apparatus can be made. For example, following the detector 22, suitable electronic circuits of conventional nature may be employed. Also the logging speed or rate at which the apparatus is raised along the borehole may be increased by simply increasing the quantity of source material supplying the neutrons. The invention is thus not to be thought of as limited to the precise embodiments disclosed but only by the language of the appended claims.

I claim:

1. A method of neutron logging of formations traversed by a borehole containing hydrogenous fluid comprising the steps of displacing the borehole fluid from a zone in contact with the wall of the borehole, radiating emitted energy including high energy neutrons unmoderated by the borehole fluid from the borehole into a formation through said zone, detecting in the borehole exclusively low energy neutrons received substantially only through said zone, and transmitting signals out of the borehole indicative of the low energy neutron flux.

2. A method of neutron logging of formations traversed by a borehole containing hydrogenous fluid comprising the steps of displacing the borehole fluid from a zone in contact with the wall of the borehole, radiating high energy neutrons unmoderated by the borehole fluid from the borehole into a formation through said zone, detecting in the borehole exclusively low energy neutrons received through said zone, substantially suppressing on the wall of the borehole low energy neutrons tending to cross the wall through an area surrounding the area occupied by said zone on the wall of the borehole, and transmitting signals out of the borehole indicative of the low energy neutron flux.

3. A method of neutron logging of formations traversed by a borehole containing hydrogenous fluid comprising the steps of displacing the borehole fluid from a zone in contact with the wall of the borehole, radiating high energy neutrons unmoderated by the borehole fluid from the borehole into a formation through said zone, detecting in the borehole thermal neutrons received through said zone, substantially suppressing on the wall of the borehole low energy neutrons tending to cross the wall adjacent said zone through a substantially greater area than the area occupied by said zone on the wall of the borehole, and indicating the thermal neutron flux as a function of the position of the zone along the borehole.

4. A method of neutron logging of formations traversed by a borehole containing hydrogenous fluid comprising the steps of displacing the borehole fluid from a zone in contact with the wall of the borehole, radiating high energy neutrons unmoderated by the borehole fluid from the borehole into a formation through said zone, detecting in the borehole epithermal neutrons received through said zone, substantially suppressing on the wall of the borehole low energy neutrons tending to cross the wall adjacent said zone through a substantially greater area than the area occupied by said zone on the wall of the borehole, and indicating the epithermal neutron flux as a function of the position of the zone along the borehole.

5. A method of neutron logging of formations traversed by a borehole containing hydrogenous fluid comprising the steps of displacing the borehole fluid from a zone in contact with the wall of a borehole, radiating high energy neutrons unmoderated by the borehole fluid from the borehole into a formation through said zone, separately detecting in the borehole epithermal and thermal neutrons received through said zone, substantially suppressing on the wall of the borehole low energy neutrons tending to cross the wall adjacent said zone substantially greater than the area occupied by said zone on the wall of the borehole, transmitting to the earth's surface quantities representative of the epithermal neutron flux and the thermal neutron flux, and indicating the ratio of said quantities as a function of the position of the zone along the borehole.

6. Neutron logging apparatus for investigating formations traversed by a borehole containing hydrogenous fluid comprising a detector responsive to low energy neutrons, a low energy neutron shield surrounding said detector with the exception of window means facing the wall of the borehole, a source of high energy neutrons located in predetermined relation to said detector, said source and said detector being so related that the latter detects low energy neutrons received substantially only through a zone in contact with the wall of the borehole through which high energy neutrons from said source are radiated into the surrounding formations, means for forcing said detector and said source toward the wall of the borehole, and a pad of material substantially transparent to neutrons in the space between the window means of said detector and the borehole wall for displacing the hydrogenous fluid from said space.

7. Neutron logging apparatus for investigating formations traversed by a borehole containing hydrogenous fluid comprising a detector of low energy neutrons, a low energy neutron shield partially surrounding said detector with the exception of an aperature facing the wall of the borehole, a source of neutrons located in front of the aperture of said detector, means for forcing said detector and said source toward the wall of the borehole, a low energy neutron transparent substance in the zone between the aperture of said detector and the borehole wall for displacing the hydrogenous fluid from said zone for reducing the number of detected neutrons which are moderated at least partially by the hydrogenous fluid.

8. Neutron logging apparatus for investigating formations traversed by a borehole containing hydrogenous fluid comprising a cylindrical detector of low energy neutrons having its axis substantially parallel to the borehole, a low energy neutron shield partially surrounding said detector with the exception of an aperture facing the wall of the borehole, a source of high energy neutrons located in front of the aperture of said detector, means for forcing said detector and said source toward the wall of the borehole, a low energy neutron transparent substance in the zone between the aperture of said detector and the borehole wall for displacing the hydrogenous fluid from said zone, and low energy neutron shielding means bounding said low energy neutron transparent substance for extending the shielding between said detector and the borehole wall for reducing the number of detected neutrons which are moderated at least partially by the hydrogenous fluid.

9. Neutron logging apparatus for investigating formations traversed by a borehole containing hydrogenous fluid comprising a cylindrical detector of low energy neutrons having its axis substantially parallel to the borehole, a low energy neutron shield partially surrounding said detector with the exception of an aperture facing the wall of the borehole and having a dihedral angle in the range of from 60° to 160° and a height in the range of from six to two inches, a source of high energy neutrons located in front of the aperture of said detector, means for forcing said detector and said source toward the wall of the borehole, a low energy neutron transparent substance in the zone between the aperture of said detector and the borehole wall for displacing the hydrogenous fluid from said zone, and low energy neutron shielding means bounding said low energy neutron transparent substance for extending the shielding between said detector and the borehole wall for reducing the number of detected neutrons which are moderated at least partially by the hydrogenous fluid.

10. Neutron logging apparatus for investigating the formations traversed by a borehole containing hydrogenous fluid comprising a detector of low energy neutrons, a low energy neutron shield partially surrounding said detector with the exception of an aperture facing the wall of the borehole, and a further low energy neutron shield bounding the aperture of said detector, said further shield being formed to follow substantially the curvature of the wall of the borehole.

11. Neutron logging apparatus for investigating the formations traversed by a borehole containing hydrogenous fluid comprising a detector of low energy neutrons, a low energy neutron shield partially surrounding said detector with the exception of an aperture facing the wall of the borehole, a source of high energy neutrons located between the aperture of the detector and the adjacent wall of the borehole, means for forcing said detector and said source toward the wall of the borehole, and a flexible low energy neutron shield at least partially surrounding the aperture of said detector and adapted to conform to the curvature of the wall of the borehole for reducing the number of detected neutrons which are moderated at least partially by the hydrogenous fluid.

12. Neutron logging apparatus according to claim 11 wherein the flexible low energy neutron shield comprises a mixture of polytetrafluorethylene and a neutron absorbing substance.

13. Neutron logging apparatus for investigating formations traversed by a borehole containing hydrogenous fluid comprising at least three neutron probes spaced at predetermined angles around the wall of the borehole and means for forcing said neutron probes against the borehole wall, each probe comprising a low energy neutron detector, a high energy neutron source, said source and said detector being so related that the latter detects low energy neutrons received substantially only through a zone in contact with the wall of the borehole through which high energy neutrons from said source are radiated into the surrounding formations, a neutron shield surrounding each detector with the exception of an aperture facing the adjacent wall of the borehole, and a low energy neutron transparent substance in the zone between the aperture of each detector and the wall of the borehole for displacing hydrogenous fluid from said zone.

14. In a method of neutron logging of formations traversed by a bore hole containing hydrogenous fluid, the steps of displacing the bore hole fluid from a space in the bore hole bounded on one side by a small portion of the wall of the bore hole, irradiating earth formations surrounding the bore hole through said bore hole wall portion with high energy neutrons, unmoderated by the borehole fluid substantially blocking the passage of low energy neutrons through the boundaries of said space other than said bore hole wall portion, and detecting only low energy neutrons in said space.

15. In a method of neutron logging of formations traversed by a bore hole containing hydrogenous fluid, the steps of displacing the bore hole fluid from a space in the bore hole bounded on one side by a small portion of the wall of the bore hole, irradiating earth formations surrounding the bore hole through said bore hole wall portion with high energy neutrons, unmoderated by the borehole fluid substantially blocking the passage of low energy neutrons through the boundaries of said space other than said bore hole wall portion, substantially blocking the passage of low energy neutrons through a zone of the bore hole wall surrounding said bore hole wall portion, and detecting only low energy neutrons in said space.

References Cited in the file of this patent
UNITED STATES PATENTS

| | | |
|---|---|---|
| 2,469,461 | Russell | May 10, 1949 |
| 2,508,772 | Pontecorvo | May 23, 1950 |
| 2,667,583 | Herzog | Jan. 26, 1954 |
| 2,680,201 | Scherbatskoy | June 1, 1954 |